Jan. 5, 1971
E. PORT
3,553,606
SYSTEM FOR PROVIDING ADJUSTING SIGNALS
TO A TRANSVERSAL FILTER EQUALIZER
Filed April 21, 1969
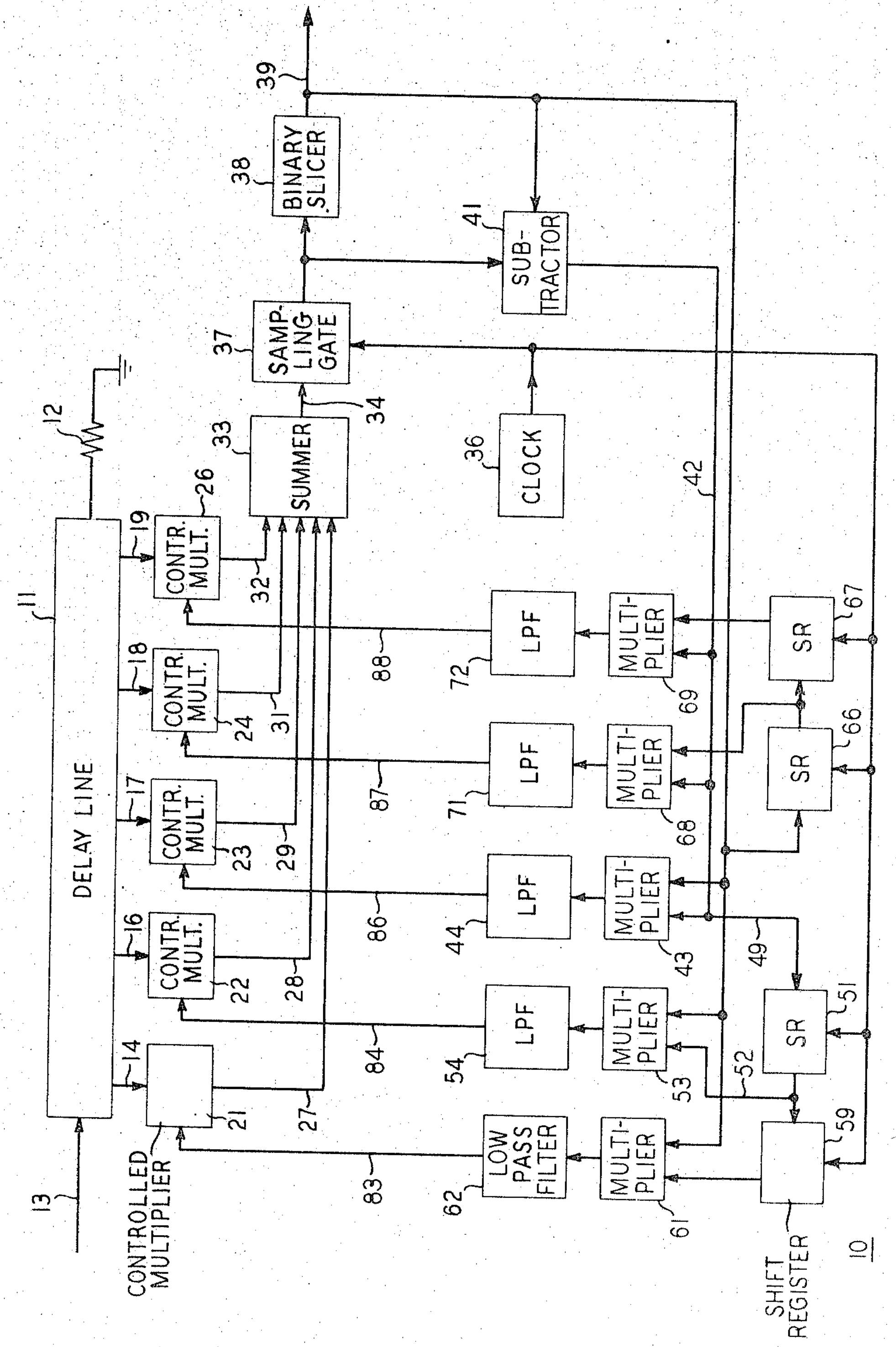
INVENTOR
E. PORT
BY
ATTORNEY 3,553,606

SYSTEM FOR PROVIDING ADJUSTING SIGNALS TO A TRANSVERSAL FILTER EQUALIZER

Erich Port, Zurich, Switzerland, assignor to Bell Telephone Laboratories, Incorporated, Murray Hill and Berkeley Heights, N.J., a corporation of New York Filed Apr. 21, 1969, Ser. No. 817,704
Int. Cl. H04b *3/04;* H03h *5/00, 7/10*
U.S. Cl. 333—18 4 Claims

ABSTRACT OF THE DISCLOSURE

A system is disclosed in which differential adjusting signals for a transversal filter equalizer are generated by delaying an error polarity signal with a first shift register and a signal polarity signal with a second shift register. The error polarity signal is correlated with the output of each stage of the second shift register while the signal polarity signal is correlated with the output of each stage of the first shift register.

FIELD OF THE INVENTION

This invention relates to a system for providing adjusting signals to a transversal filter equalizer and particularly to a system for providing adjusting signals to an adaptively adjustable transversal filter equalizer.

BACKGROUND OF THE INVENTION

When a multifrequency signal which includes a series of individual data or symbol bits is transmitted through a bandwidth limited medium, different frequency components in the signal may be delayed and attenuated different amounts so that components from more than one of the individual symbol bits may coincidentally arrive at a signal receiver thereby causing intersymbol interference.

One device used to equalize a received signal distorted by intersymbol interference is a transversal filter. A transversal filter equalizer is a time domain device in which one or more equalization signals each equal to a multiple of the received signal displaced in time are added to the received signal to provide an equalized output signal.

A system which adaptively adjusts the equalization signal multiples, in a transversal filter equalizer, is disclosed by R. W. Lucky in U.S. Patent 3,368,168 entitled "Adaptive Equalizer for Digital Transmission Systems Having Means to Correlate Present Error Components With Past, Present and Future Received Data Bits," which issued on Feb. 6, 1968. In the Lucky disclosure, an error signal indicating the sign of the difference between an equalized signal and an ideal signal is delayed a predetermined time interval. A received signal polarity signal is delayed by a shift register chain. The output from each shift register stage is then correlated with the delayed error signal to provide a set of differential adjusting signals for increasing or decreasing respective equalization multiples.

The above system operates because a received data signal is random when averaged over a long time. Therefore, when the error signal is correlated with the received signal, the intersymbol interference from preceding and succeeding bits will be random and tend to cancel each other while the error due to the received signal will be nonrandom. In a like manner when the received signal is correlated with a displaced error signal, the intersymbol interference due to the received signal at the displaced time will be nonrandom while the signal as well as intersymbol interference from other bits at the displaced time will be random and tend to cancel out. The correlated signals can then be used as the differential adjusting signals to drive the error signal to zero.

To be commercially feasible, transversal filter equalizers are constructed so that the number of equalization signals generated therein may be easily changed. This requires the changing of circuit boards therein or the inclusion of switches. Because of the predetermined delay of the error signal, the Lucky equalizer is nonsymmetrical so that when the number of equalization signals employed is altered, the predetermined time interval must also be changed. This not only increases the cost of construction of commercial units, but also increases the potential for misadjustment in the field.

BRIEF DESCRIPTION OF THE INVENTION

In accordance with this invention, differential adjusting signals are generated for a transversal filter equalizer by delaying an error polarity signal with a first shift register chain and a signal polarity signal with a second shift register chain. The error polarity signal is correlated with the output of each stage of the second shift register chain while the signal polarity signal is correlated with the output of each stage of the first shift register chain. In this way a symmetrical circuit is provided for generating the differential adjusting signals.

DESCRIPTION OF THE DRAWING

The sole figure is a block diagram showing a system embodying the principles of this invention.

DETAILED DESCRIPTION

The sole figure shows an adaptive transversal filter equalization system 10 of the type disclosed in the aforementioned patent of R. W. Lucky modified to incorporate the principles of this invention. The transversal filter 10 includes a tapped delay line 11 terminated in its characteristic impedance 12. A received data signal having been distorted by a transmission medium not shown is applied to the delay line 11 at input terminal 13 to provide delayed replicas thereof at a plurality of delay line taps 14 and 16 through 19. It should be understood that a delay line providing any number of time displayed signals may be employed in a system of this invention. Five have been selected in this instance for ease of explanation.

The delay line taps 14 and 16 through 19 are connected to signal input terminals of control multipliers 21 through 24 and 26, respectively. The control multipliers 21 through 24 and 26 provide equalization signals which are replicas of signals applied to the respective signal input terminals 14 and 16 through 19, respectively, on leads 27 through 29 and 31 and 32, respectively, in response to control signals applied on leads 83, 84 and 86 through 88, respectively. The signals provided by the control multipliers 21 through 24 and 26 will normally have a multiplication factor less than 1. They are considered multipliers, however, rather than attenuators because the sign of the equalization signals are dependent upon the signs of the applied signals.

The equalization signals on leads 27 through 29, 31 and 32 are added together in a summer 33 to provide an equalized analog signal on lead 34. A clock 36, phase locked to the data signal on terminal 13 by means not shown enables a sampling gate 37 to pass the equalized signal to a binary slicer 38 at the received data rate. The binary slicer 38 provides a digitized equalized signal on an output lead 39. The equalized analog signal is a reconstruction of the applied data signal. The digitized equalized signal on the other hand is a normalization of the equalized analog signal and, therefore, represents the actual level and polarity which the equalized analog signal should attain. Therefore, the equalized analog signal and the digitized equalized signal are both applied to a subtracter 41 which provides an error signal on a lead 42 which is equal to the difference between the actual analog equalized signal and the ideal. In this case, the subtracter 41 is a high gain differential amplifier which provides a limiting output so that the signal on lead 42 represents merely the sign or polarity of the error signal.

The error signal on lead 42 and the digitized equalized signal on terminal 39 are applied to a pair of input terminals of multiplier 43. The output from multiplier 43 is passed through low pass filter 45 to provide an adjusting signal on a lead 86. The correlation of the error signal with the digitized equalized signal, representing the signal polarity, isolates the component of the error in phase with the received signal. The voltage from the low pass filter 44 adjusts the gain of the controlled multiplier 23 until the error component in phase with the received signal is forced to zero at which time the output from low pass filter 44 will be zero.

The error polarity signal on lead 42 is applied by lead 49 to a shift register stage 51 which is advanced at the received data rate by the clock 36. The output from shift register stage 51 is applied by lead 52 to a multiplier 53 where it is multiplied with the digitized equalized signal and applied to low pass filter 54 to provide a correlated signal on lead 84.

The correlation of the equalized digitized signal with the error delayed one bit interval provides a signal indicative of the error occurring one time interval earlier than the pulse it is caused by. The correlated signal on the lead 84 controls the amplitude of controlled multiplier 22.

In a like manner the error signal delayed two bit intervals by shift register stages 51 and 59 is correlated with the equalized digitized signal in multiplier 61 and low pass filter 62 to control the controlled multiplier 21.

To adjust the controlled multipliers 24 and 26 following the center tap 17 of the delay line 11, shift register stages 66 and 67 delay the digitized equalized signal one interval each to be correlated with the error polarity signal by means of multipliers 68 and 69 and low pass filters 71 and 72, respectively. The low pass filters 71 and 72, respectively, provide adjusting control signals to controlled multipliers 24 and 26.

It should be understood that various other embodiments and modifications can be made by those skilled in the art without departing from the spirit and scope of the invention.

What is claimed is:

1. In combination means responsive to a first signal for providing a replica of said first signal delayed a predetermined time interval;

means responsive to a second signal for providing a replica of said second signal delayed said predetermined time interval;

means responsive to the long term average of the product of said first signal and said replica of said second signal for providing a first adjusting signal; and means responsive to the long term average of the product of said second signal and said replica of said first signal for providing a second adjusting signal.

2. The combination as defined in claim 1 also including means responsive to a received data signal for providing first, second and third delayed data signals;

means responsive to the product of said first adjusting signal and said first delayed data signal for providing a first equalization signal;

means responsive to the product of said second adjusting signal and said third delayed data signal for providing a second equalization signal;

means for algebraically combining said first and second equalization signals and said second delayed data signal to provide an equalized analog signal;

means responsive to said equalized analog signal for providing said first signal; and means responsive to the difference between said first signal and said equalized analog signal for providing said second signal.

3. The combination as defined in claim 2 in which said means for providing said replica of said first signal is a shift register stage and said means for providing said replica of said second signal is a shift register stage.

4. The combination as defined in claim 3 in which each means responsive to a long term average includes a multiplier driving a low pass filter.

References Cited

UNITED STATES PATENTS

| | | | |
|---|---|---|---|
| 3,366,895 | 1/1968 | Lucky | 333—18 |
| 3,368,168 | 2/1968 | Lucky | 333—28X |
| 3,400,332 | 9/1968 | O'Neill et al. | 333—18X |
| 3,477,043 | 11/1969 | Farrow | 333—28X |
| 3,479,458 | 11/1969 | Lord et al. | 333—18X |

ELI LIEBERMAN, Primary Examiner

T. VEZEAU, Assistant Examiner

U.S. Cl. X.R.

333—28, 70